United States Patent
Voss et al.

(10) Patent No.: US 12,043,094 B2
(45) Date of Patent: Jul. 23, 2024

(54) SEALING ELEMENT FOR VEHICLE CANOPY

(71) Applicant: Rock Solid Industries International (Pty) Ltd., Pietermaritzburgh (CA)

(72) Inventors: Michael Voss, Aledo, TX (US); Jay Dulloo, Pietermaritzburgh (CA); Jozua Joubert, Pietermaritzburgh (CA)

(73) Assignee: Rock Solid Industries International (Pty) Ltd., Pietermaritzburgh (ZA)

( * ) Notice: Subject to any disclaimer, the term of this patent is extended or adjusted under 35 U.S.C. 154(b) by 0 days.

(21) Appl. No.: 17/864,050

(22) Filed: Jul. 13, 2022

(65) Prior Publication Data
US 2023/0108473 A1    Apr. 6, 2023

(30) Foreign Application Priority Data
Oct. 4, 2021  (ZA) .............................. F2021/01209

(51) Int. Cl.
*B60J 10/277* (2016.01)
*B60J 10/15* (2016.01)
*B60J 10/84* (2016.01)

(52) U.S. Cl.
CPC ............... *B60J 10/84* (2016.02); *B60J 10/15* (2016.02); *B60J 10/277* (2016.02)

(58) Field of Classification Search
CPC . B60J 10/277; B60J 10/27; B60J 7/141; B60J 10/24
See application file for complete search history.

(56) References Cited

U.S. PATENT DOCUMENTS

| | | | | |
|---|---|---|---|---|
| 6,231,117 B1 * | 5/2001 | Nagahashi | ............... | B60J 10/70 52/204.67 |
| 10,189,340 B2 * | 1/2019 | Schmeichel | ............. | B60J 7/198 |
| 11,167,629 B2 * | 11/2021 | Choi | ........................ | B60J 10/74 |
| 2021/0101459 A1 * | 4/2021 | Mihal | ....................... | B60J 10/82 |

FOREIGN PATENT DOCUMENTS

| | | | | |
|---|---|---|---|---|
| WO | WO-2012118352 A2 * | 9/2012 | ............ | B60J 10/277 |
| ZA | A2021/00458 | 4/2021 | | |
| ZA | F2021/00459 | 4/2021 | | |

OTHER PUBLICATIONS

WO 2012/118352 English translation from WIPO (Year: 2012).*

* cited by examiner

*Primary Examiner* — Daniel J Troy
*Assistant Examiner* — Susan M. Heschel
(74) *Attorney, Agent, or Firm* — K&L Gates LLP (57) ABSTRACT

A sealing element for a vehicle cap is disclosed. The sealing element comprises a body portion, a flange attached to the body portion in a longitudinal orientation, and an angle. The flange is configured to move between an open and closed position. The flange is compressed as it moves from the open position to the closed position. The sealing element is comprised of a low density rubber and creates an airtight and watertight seal between the vehicle cap and the truck bed.

21 Claims, 7 Drawing Sheets

SEALING ELEMENT FOR VEHICLE CANOPY

CROSS REFERENCE TO RELATED APPLICATION

This application claims the benefit under 35 U.S.C. § 119(a) of South African Design Application Serial No. F2021/01209, entitled FOOT PLATE SEAL, filed Oct. 4, 2021, the entire disclosure of which is hereby incorporated by reference herein.

BACKGROUND

The present disclosure relates generally to vehicle accessories and more specifically to vehicle canopies such as truck bed caps. The popularity of pickup trucks and other similar vehicles is consistently increasing due to the versatility of truck beds and accompanying spacious cabs which, in some instances, are equivalent to or greater than the size of a standard sedan vehicle.

Often times, it is desirable for pickup truck owners to enclose the bed of the truck for privacy, security, storage, or even shelter during camping excursions in some instances. Truck bed caps are a convenient way to securely enclose the truck bed. The Applicant's truck bed caps are described in greater detail in U.S. patent application Ser. No. 17/091,114, which is set to issue as U.S. Pat. No. 11,376,937 on Jul. 5, 2022, which is herein incorporated by reference in its entirety.

Truck bed caps require a durable seal to attach the truck bed cap to the truck bed. Most current truck bed caps on the market employ a conventional and standardized D rubber seal and corresponding rubber blocks to attach the truck bed cap to the bed to thoroughly seal off the interior of the cap from any elements, such as water and dirt. In most instances in conventional designs on the market, the D rubber seal directly abuts the tailgate of a truck. Often times the truck bed cap corners hang over the tailgate. In such instances, the D rubber seal is compressed all around the cap bottom surface, but where it hangs over the tailgate, the D rubber seal is expanded naturally. In some instances, the D rubber seal is fixed to the truck bed cap by way of an adhesive fixing.

However, despite being widely acceptable in the industry, the D rubber seal comes with some disadvantages. Over time, the D rubber seal wears down and becomes weak with use. For example, each time a user opens and closes the truck tailgate, the tailgate shears the D rubber seal. Eventually, the repeated opening and closing motions of the tailgate will cause the D rubber seal to shear until it is too weak and fragile to correctly seal off the truck bed. Eventually the D rubber seal tears and breaks due to the consistent pressure exerted on the D rubber seal during each closing and opening motion of the tailgate.

As such, there is currently a need in the truck bed cap industry for an improved rubber seal which is significantly more resistant to the wear and tear caused by the repeated opening and closing motions of the truck tailgate.

SUMMARY

In one general aspect, the present disclosure is directed to a new and improved rubber sealing element for a truck bed cap. The new sealing element comprises a flange which holds the rubber seal in place by way of a mechanical fixing. The new sealing element can also be used in conjunction with corresponding rubber blocks in some instances. The corresponding rubber blocks are configured to hold the truck bed cap at a certain height so it isn't pressing down too low on the truck bed. Due to the mechanical fixing, the flange of the new rubber seal will not shear off or tear. These and other benefits that can be realized through embodiments of the present disclosure will be apparent from the description that follows.

FIGURES

Various embodiments of the present disclosure are described by way of example in conjunction with the following figures.

DETAILED DESCRIPTION

The Applicant of the present application also owns the following applications which are herein incorporated by reference in their respective entireties:

- South African Design Application Serial No. F2021/01209, entitled FOOT PLATE SEAL, filed Oct. 4, 2021;
- South African Design Application Serial No. A2021/01208, entitled FOOT PLATE SEAL, filed Oct. 4, 2021;
- South African Design Application Serial No. F2021/000459, entitled FOOT PLATE SEAL, filed Apr. 29, 2021; and
- South African Design Application Serial No. A2021/000458, entitled FOOT PLATE SEAL, filed Apr. 29, 2021.

FIGS. 1-8 depict various views of a sealing element 100 for a vehicle canopy. The sealing element 100 comprises a body portion 106 and a flange 102. The body portion 106 comprises a substantially trapezoidal shape in the default position, as will be discussed in greater detail below. The body portion 106 comprises a substantially rectangular shape in the compressed position, as will be discussed in greater detail below. The flange 102 extends longitudinally with respect to the body portion 100 and forms an angle 104 on the underside of the sealing element 100. The angle 104 is less than 90 degrees in most instances when the sealing element is in its default position, as will be discussed in greater detail below. The sealing element 100 also comprises a retention slot 114. In some instances, the retention slot 114 is configured for friction fit attachment with components of a vehicle canopy. In some instances, the retention slot 114 is configured for use with an adhesive.

As briefly discussed above, the sealing element 100 is comprised of rubber. Rubber comprises many advantageous properties which makes it an ideal material for the sealing element 100. For example, rubber comprises many versatile features such as flexibility, elasticity, strength, and friction. Rubber is also known to provide a reliable airtight and water tight seal in many instances. Embodiments of the present disclosure utilize low density rubber which comprises a softer and lighter makeup. Lower density rubbers are incredibly sturdy and are able to withstand repeated and extreme forces and pressures without breaking or cracking. Other embodiments are contemplated wherein materials such as silicone, nitrile butadiene rubber, or neoprene are used as materials for the sealing element 100.

The sealing element 100 illustrated in FIGS. 1-8 is comprised of a lower density rubber in many instances. The sealing element 100 comprises a rubber with a significantly softer density. In particular, the softer density rubber allows for a better fit for the vehicle canopy on the truck bed. The softer density rubber still allows for the sealing element 100 to maintain the vehicle canopy's weight and any other additional weight (e.g., for a roof rack).

Figure 1:
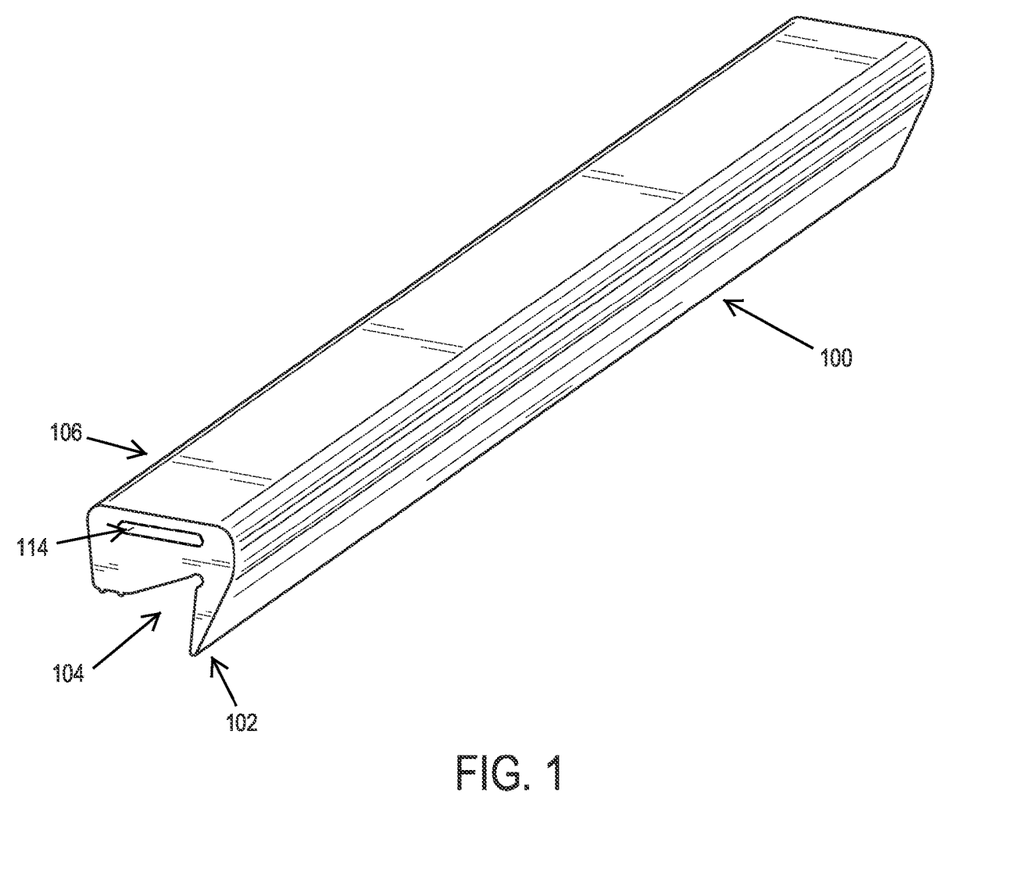
FIG. 1 illustrates a top perspective view of an example embodiment of a sealing element for a vehicle canopy according to the present disclosure.
Figure 2:
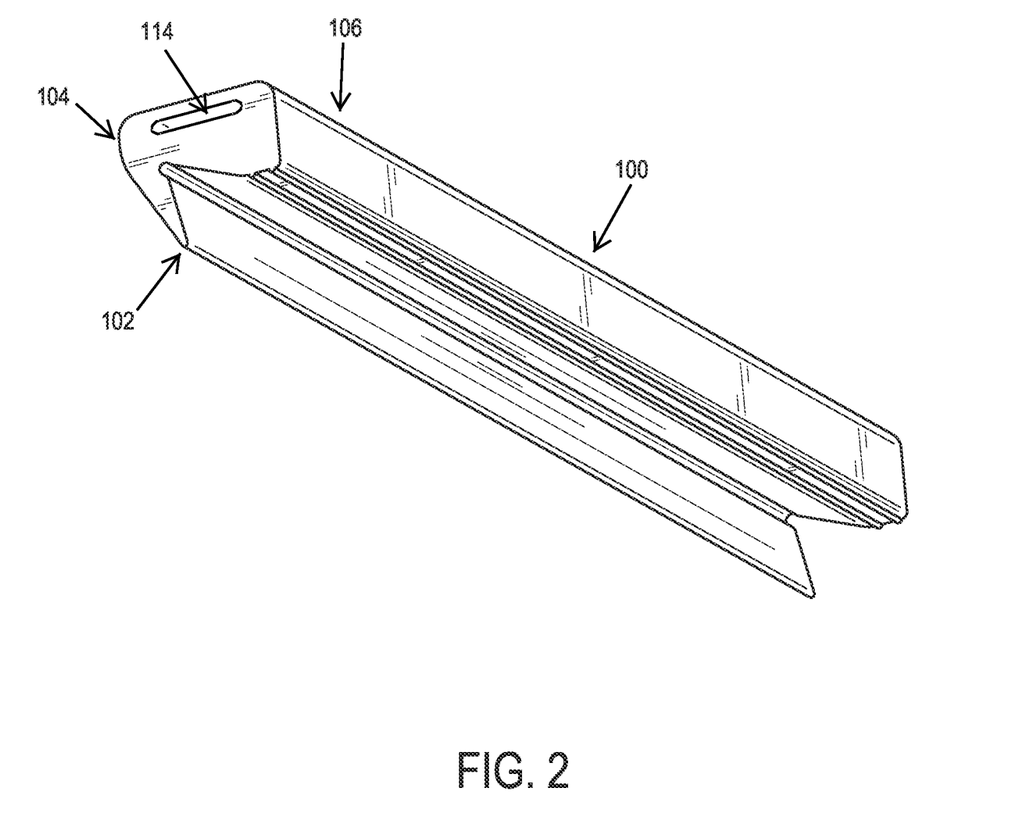
FIG. 2 illustrates a bottom perspective view of a sealing element for a vehicle canopy according to various embodiments of the present disclosure.
Figure 3:
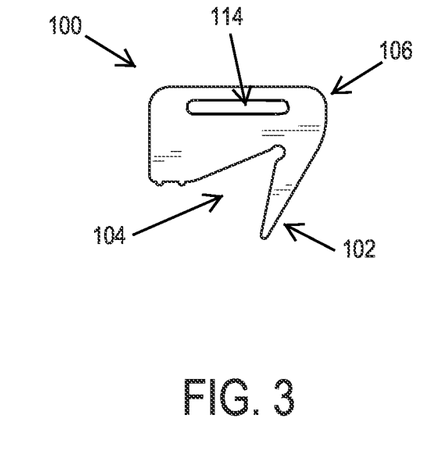
FIG. 3 illustrates a left side view of a sealing element for a vehicle canopy according to various embodiments of the present disclosure.
Figure 4:
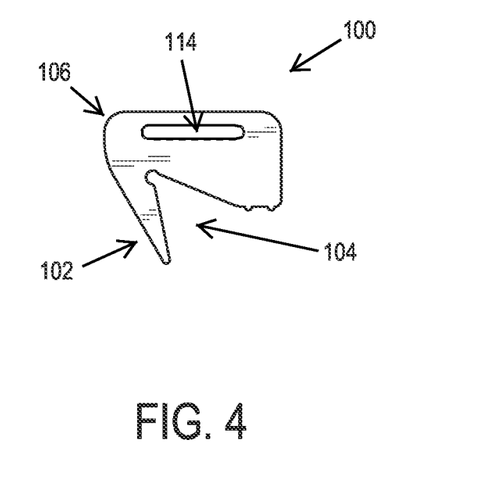
FIG. 4 illustrates a right side view of a sealing element for a vehicle canopy according to various embodiments of the present disclosure.
Figure 5:
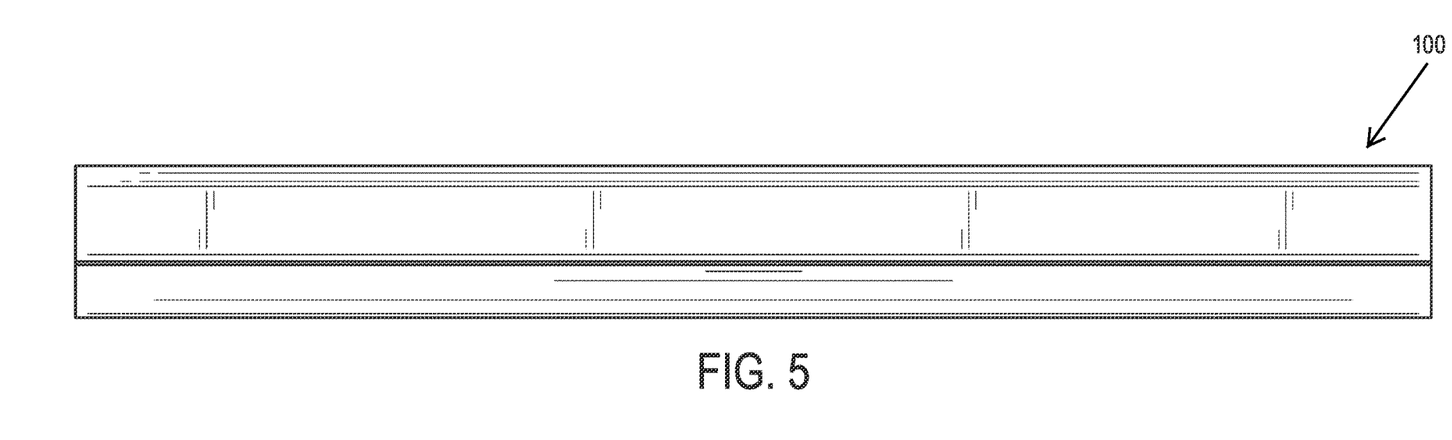
FIG. 5 illustrates a rear side view of a sealing element for a vehicle canopy according to various embodiments of the present disclosure.
Figure 6:
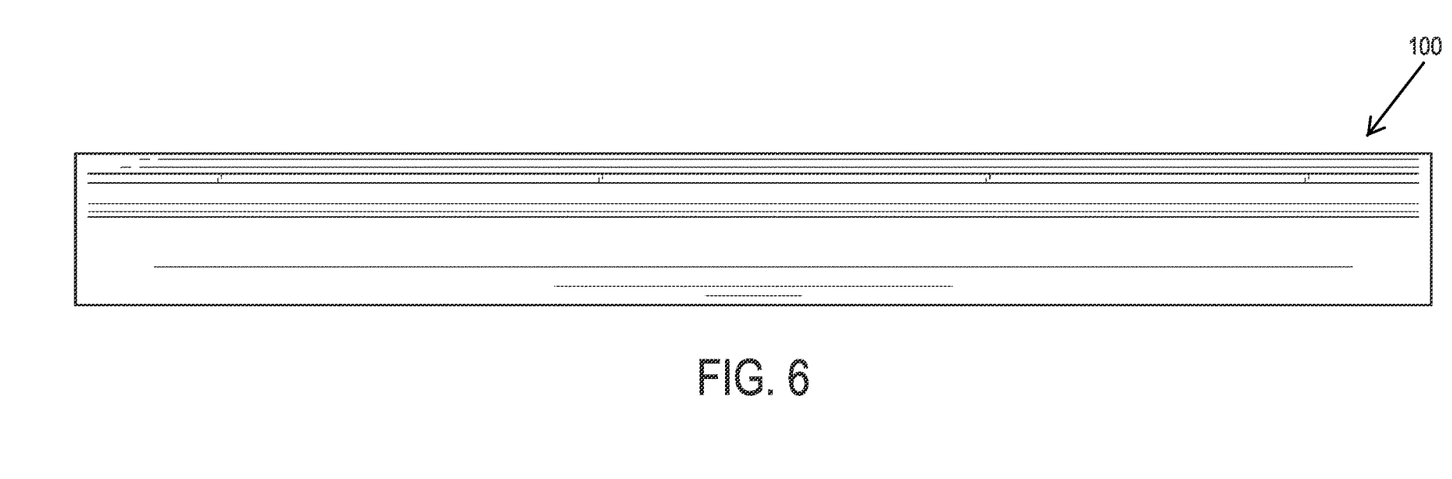
FIG. 6 illustrates a front side view of a sealing element for a vehicle canopy according to various embodiments of the present disclosure.
Figure 7:
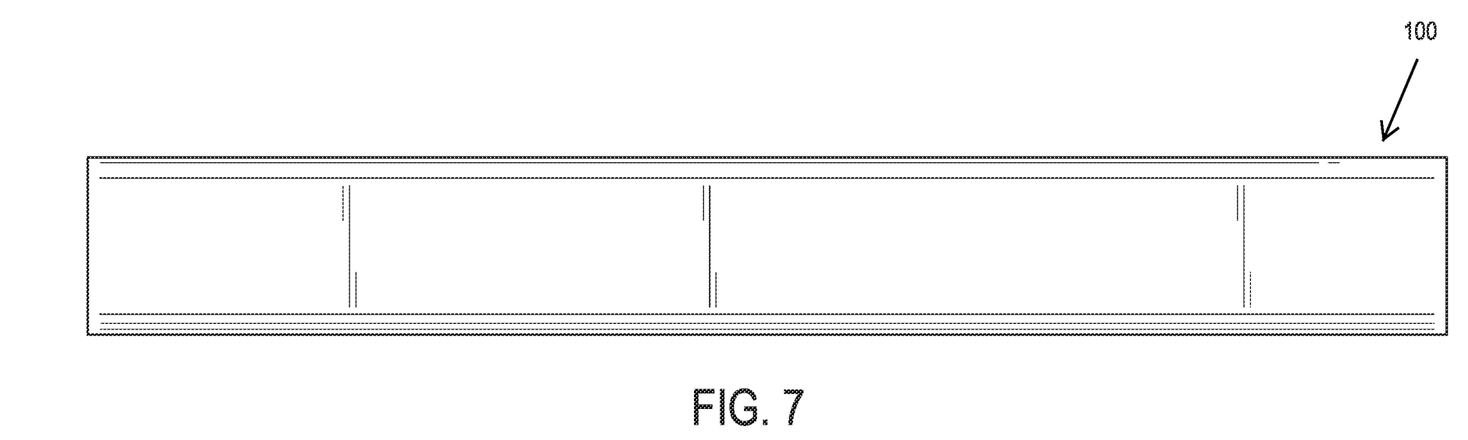
FIG. 7 illustrates a top side view of a sealing element for a vehicle canopy according to various embodiments of the present disclosure.
Figure 8:
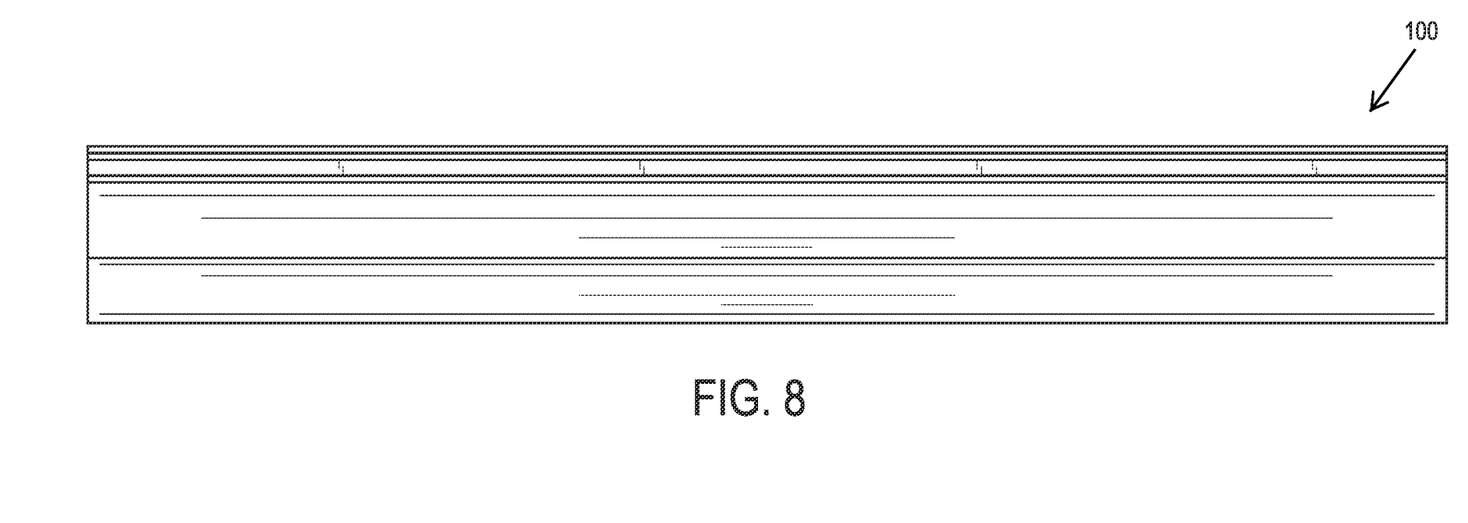
FIG. 8 illustrates a bottom side view of a sealing element for a vehicle canopy according to various embodiments of the present disclosure.
Figure 9:
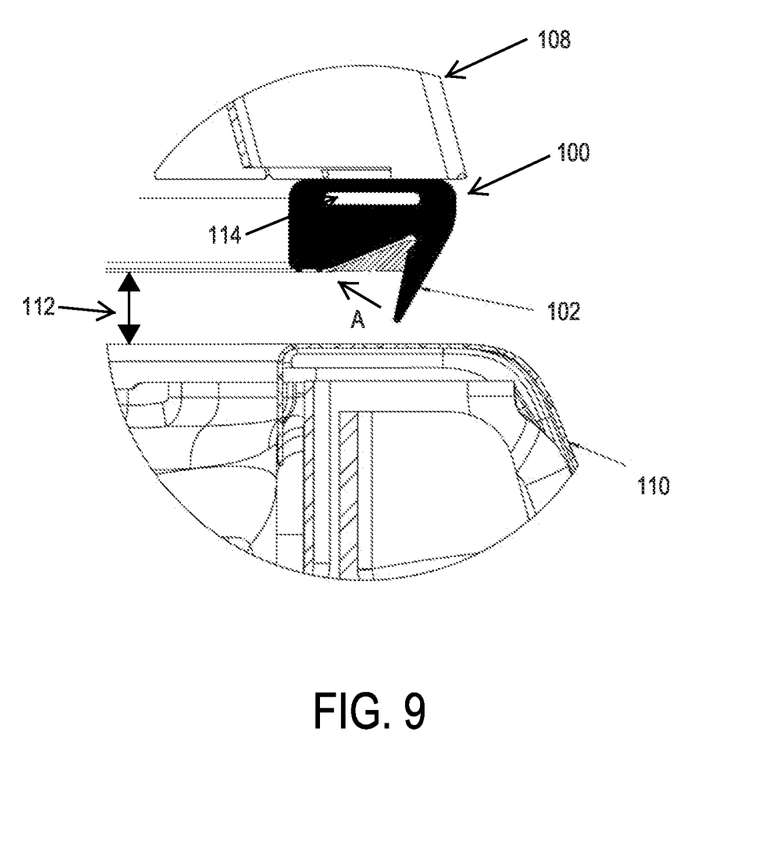
FIG. 9 illustrates a perspective view of the sealing element of FIG. 1 in an open position in conjunction with a vehicle canopy and truck bed according to various embodiments of the present disclosure.

Turning to FIG. 9, when the truck bed cap 108 is installed on the truck bed 110 and the truck tailgate is closed, the sealing element 100 is in its compressed state. When the sealing element 100 is in its compressed state, the flange 102 is compressed inwards toward the body portion 106. As illustrated primarily in FIG. 9, the flange 102 is configured to be compressed during opening and closing motions of a truck tailgate. The position of the flange 102 provides a unique advantage not previously discussed or provided for in the prior art. In particular, the prior art provides for traditional D rubber seals as discussed above. The positon of the flange 102 on the sealing element 100 allows for the flange 102 to adapt to and absorb the pressure and forces applied during an opening or closing motion of the truck tailgate. FIGS. 1-8 illustrate the flange 102 in its default position. The default position of the flange 102 corresponds to the truck tailgate being in an open position. When the truck tailgate is in the open position, there is no contact between the flange 102 and the truck tailgate.

FIG. 9 also illustrates the position of the sealing element 100 with respect to the truck bed cap 108 and the truck bed 110. As seen in FIG. 9, the sealing element 100 is nestled in between the truck bed cap 108 and the truck bed 110. The sealing element 100 is configured to be positioned on top of rubber blocks in some instances. As discussed above, the rubber blocks are configured to hold the truck bed cap 108 at a certain height so it is not pressing down too low on the truck bed 110. The rubber blocks are also configured to offset any excessive forces on the sealing element 100 and the truck bed 110. FIG. 9 depicts an area 112 where rubber blocks of various heights can be installed adjacent to the sealing element 100 for use in conjunction with the truck bed cap 108 and the truck bed 110.

Figure 10:
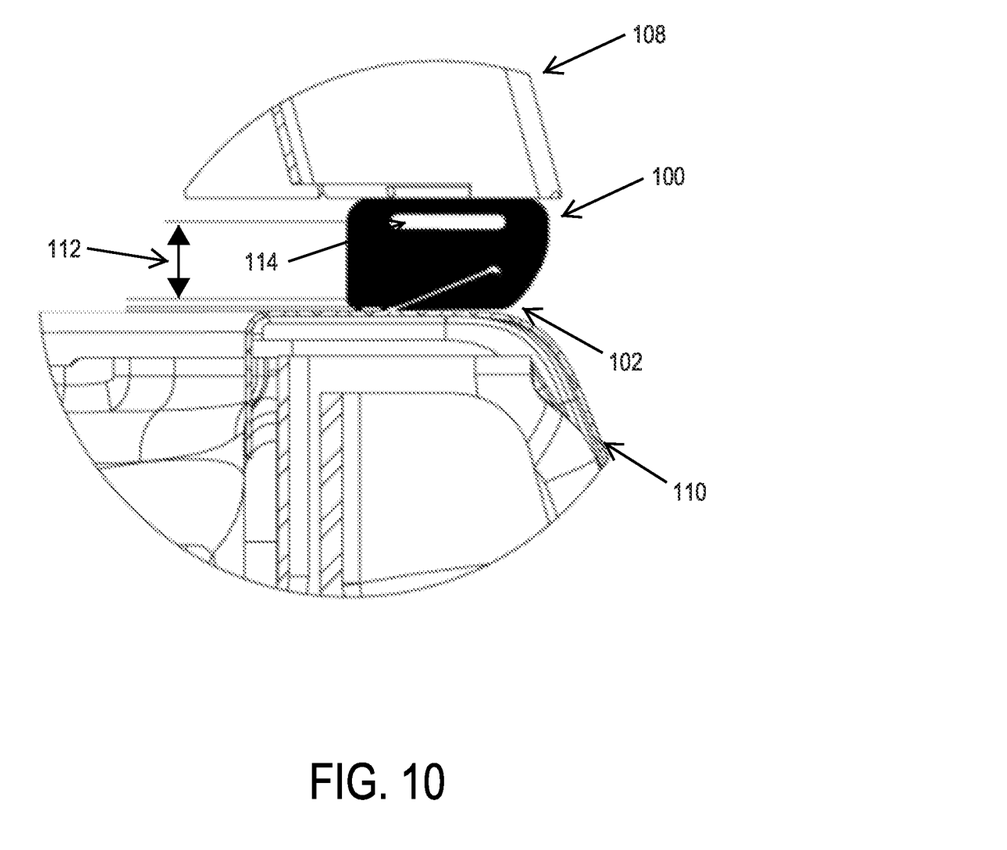
FIG. 10 illustrates a perspective view of the sealing element of FIG. 1 in a closed position in conjunction with a vehicle canopy and truck bed according to various embodiments of the present disclosure.

Arrow A in FIG. 9 illustrates the transition of the flange 102 from its default position to its compressed position. When the truck bed cap 108 is in the installed state, in order to move the flange 102 from its default position to its compressed position, a user must initiate a closing motion of the truck tailgate. As a user closes the truck tailgate, the truck tailgate gradually engages the flange 102 of the sealing element 100. During this closing motion, the flange 102 moves into its compressed position as illustrated in FIG. 10. As the flange 102 is compressed inwardly, the angle 104 decreases until the flange 102 is in direct contact with the body portion 106.

As discussed above, the angle 104 decreases during the closing motion as the flange 102 moves into its compressed position, as illustrated in FIG. 10. When the truck bed cap 108 is in its installed state, in order to move the flange 102 from its compressed position to its default position, a user must initiate an opening motion of the truck tailgate. As a user opens the truck tailgate, the truck tailgate gradually disengages the flange 102 of the sealing element 100. During this opening motion, the flange 102 moves into its default position. As the flange 102 moves into its default position, the angle 104 is still maintained at less than 90 degrees. As a result, the sealing element 100 provides a unique benefit not provided in the prior art as the flange 102 does not drag with the truck tailgate during the opening motion which prevents damage to the sealing element 100. The arrangement and mechanical engagement of the flange 102 distinguishes the sealing element 100 from the D rubber seal.

The examples presented herein are intended to illustrate potential and specific implementations of the present disclosure. It can be appreciated that the examples are intended primarily for purposes of illustration of the disclosure for those skilled in the art. No particular aspect or aspects of the examples are necessarily intended to limit the scope of the present disclosure. Further, it is to be understood that the figures and descriptions of the present disclosure have been simplified to illustrate elements that are relevant for a clear understanding of the present disclosure, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A sealing element for use with a truck cap and truck tailgate, comprising:
   a body portion having a substantially flat flange-engagement surface;
   a flange having a substantially flat body portion-engagement surface, wherein said flange is attached to said body portion in a longitudinal orientation and is configurable in a default position and a compressed position, wherein said flange is separately movable from the body portion; and
   an angle formed between said flange-engagement surface of said body portion and said body portion-engagement surface of said flange, wherein said flange is configured to be compressed during a closing motion of the truck tailgate, and wherein said flange moves from said default position to said compressed position during the closing motion so that the flange-engagement surface and the body portion-engagement surface are substantially parallel.

2. The sealing element of claim 1, wherein said sealing element comprises rubber.

3. The sealing element of claim 1, wherein said angle is less than 90 degrees in said default position.

4. The sealing element of claim 3, wherein said angle decreases as the flange moves from said default position to said compressed position.

5. The sealing element of claim 3, wherein said flange moves into said default position while still maintaining said angle at less than 90 degrees when the truck tailgate is opened.

6. The sealing element of claim 1, wherein said sealing element comprises a density, and wherein said density enables said sealing element to absorb forces placed on said sealing element during the closing motion.

7. The sealing element of claim 1, wherein said sealing element creates an airtight and water tight seal between said truck cap and said truck tailgate.

8. A sealing gasket for use with a truck cap and truck tailgate, comprising:
    a body portion having a flange-engagement surface;
    a flange having a substantially flat engagement surface corresponding to said flange-engagement surface, wherein said flange is attached to said body portion in a longitudinal orientation and is configurable in an open position and a closed position, wherein said flange is separately movable from the body portion; and
    an angle formed between said flange-engagement surface of said body portion and said engagement surface of said flange, wherein said flange is configured to be compressed during a closing motion of the truck tailgate, and wherein said flange moves from said open position to said closed position during the closing motion so that the flange-engagement surface and the body portion-engagement surface are substantially parallel.

9. The sealing gasket of claim 8, wherein said sealing gasket comprises rubber.

10. The sealing gasket of claim 8, wherein said angle is less than 90 degrees in said open position.

11. The sealing gasket of claim 10, wherein said angle decreases as the engagement surface of said flange moves towards the flange-engagement surface of said body portion while said flange moves from said open position to said closed position.

12. The sealing gasket of claim 10, wherein said flange moves into said open position while still maintaining said angle at less than 90 degrees when the truck tailgate is opened.

13. The sealing gasket of claim 8, wherein said sealing gasket comprises a density, and wherein said density enables said sealing gasket to absorb forces placed on said sealing gasket during the closing motion.

14. The sealing gasket of claim 8, wherein said sealing gasket creates an airtight and water tight seal between said truck cap and said truck tailgate.

15. A seal for use with a truck cap and truck tailgate, comprising:
    a body portion having a flange-engagement surface;
    a flange having a substantially flat body portion-engagement surface, wherein said flange is attached to said body portion, wherein said flange is attached to said body portion in a longitudinal orientation and is configurable in a disengaged position and an engaged position, wherein said flange is separately movable from the body portion and comprises a wedge shape; and
    an angle formed between said flange-engagement surface of the body portion and said body portion-engagement surface of said flange, wherein said flange is configured to be compressed during a closing motion of the truck tailgate, and wherein said flange moves from said disengaged position to said engaged position during the closing motion so that the flange-engagement surface and the body portion-engagement surface are substantially parallel.

16. The seal of claim 15, wherein said seal comprises rubber.

17. The seal of claim 15, wherein said angle is less than 90 degrees in said disengaged position.

18. The seal of claim 17, wherein said angle decreases as the flange moves from said disengaged position to said engaged position.

19. The seal of claim 17, wherein said flange moves into said disengaged position while still maintaining said angle at less than 90 degrees when the truck tailgate is opened.

20. The seal of claim 15, wherein said seal comprises a density, and wherein said density enables said seal to absorb forces placed on said seal during the closing motion.

21. The seal of claim 15, wherein said seal creates an airtight and water tight seal between said truck cap and said truck tailgate.

* * * * *